April 28, 1953     M. J. JAKOBSON     2,636,993
FAST COUNTING CIRCUIT

Filed Nov. 7, 1951

INVENTOR.
MARK J. JAKOBSON
BY
Roland A. Anderson
ATTORNEY.

Patented Apr. 28, 1953

2,636,993

UNITED STATES PATENT OFFICE 2,636,993

FAST COUNTING CIRCUIT

Mark J. Jakobson, Berkeley, Calif., assignor to the United States of America as represented by the United States Atomic Energy Commission Application November 7, 1951, Serial No. 255,179

6 Claims. (Cl. 250—71)

The present invention relates to an improved electronic circuit particularly adapted for high-speed counting and coincidence counting.

Modern research in the field of physics has emphasized the need for circuits capable of counting rapidly recurring pulses and apparatus capable of producing such pulses from high-speed particles. Also there is a need for equipment capable of identifying particular particles in the presence of other particles having similar characteristics. For example, the detection and counting of mesons is particularly difficult in that other charged particles, inevitably present, produce background signals of such magnitude that the desired signal is almost entirely masked. Conventionally mesons are identified and counted by measuring the $\beta$ rays produced by meson decay. Numerous difficulties and disadvantages attend this method and thus the present invention is disclosed in connection with the counting of so-called $\pi^+$ mesons; however, it will be appreciated that the invention is not so limited and may be in fact employed to count various other particles with proper circuit modification.

It is an object of the present invention to provide an improved high-speed counting circuit.

It is another object of the present invention to provide an improved coincidence counting circuit.

It is a further object of the present invention to provide an improved electronic counter having double coincidence circuits for identifying particular pulses in the presence of high background noise.

It is a still further object of the present invention to provide an improved counter for $\pi^+$ mesons.

Figure 1:
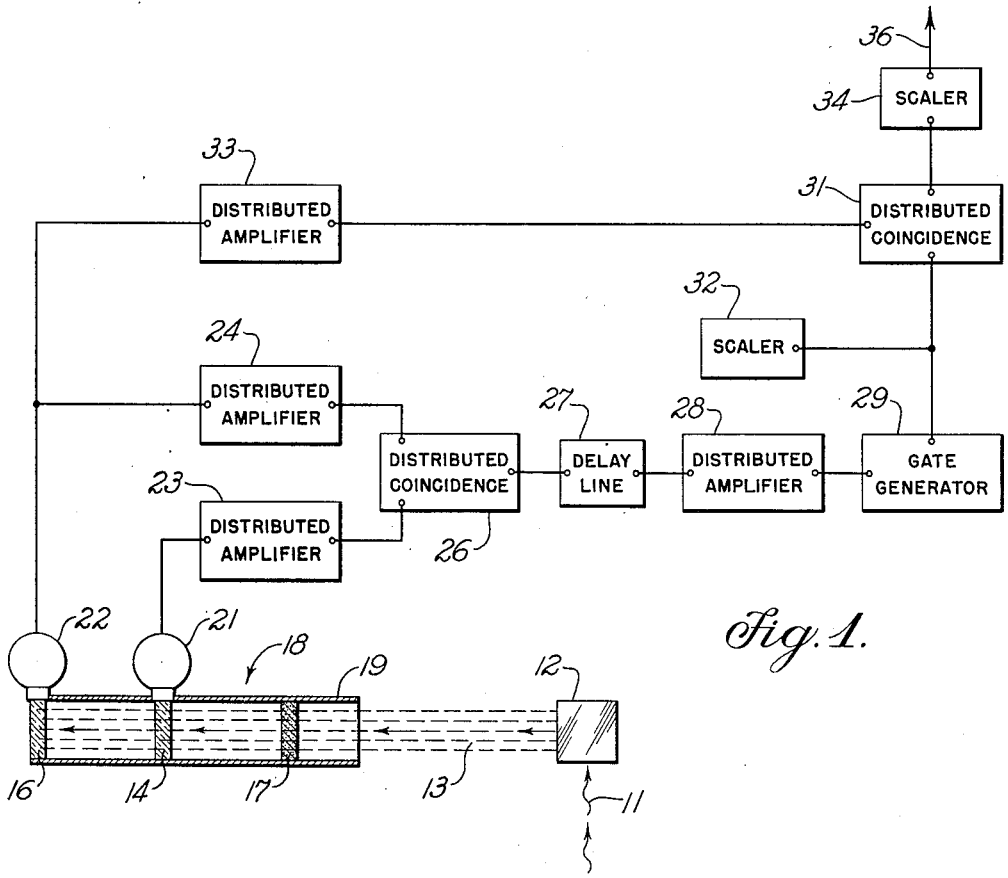
Figure 2:
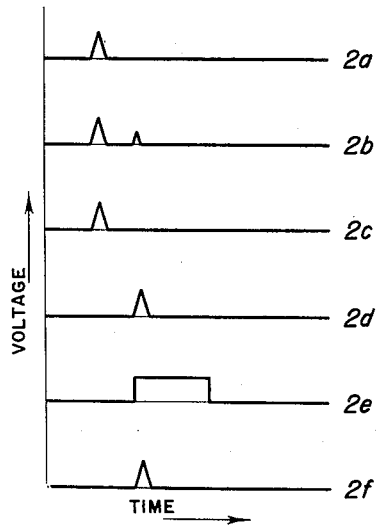

Numerous other advantages and objects of the present invention will become apparent from the following specification and claims taken together with the accompanying drawing wherein Figure 1 is a block circuit diagram of one embodiment of the present invention and Figure 2 is a series of graphs having a common time base and showing the waveshapes of signals at various points in the circuit of Figure 1.

With regard to the counting of mesons, it is noted that the existence of these unstable particles has only within recent years been confirmed and much of the theory relative thereto is still in the formative stage. It has been determined that there are positively and negatively charged mesons and also mesons have been further classified as heavy and light mesons. The heavy mesons, called $\pi$ mesons, have a mass of about 284 times that of an electron and decay into $\mu$ mesons (light mesons) having a mass of about 216 times the mass of an electron. Also $\mu$ mesons decay, and in vacuum this decay may result in the liberation of $\beta$ rays. The half-life of $\pi$ and $\mu$ mesons is measured in millionths of a second and thus it will be seen that it is particularly difficult to detect or count these particles. Furthermore, the decay products of $\pi$ and $\mu$ mesons depend upon the original charge of the particles, which may be either plus or minus, and because of this it has been the practice to identify mesons by the measurement of the resultant $\beta$ rays produced. The illustrated embodiment of the present invention accomplishes the measurement of $\pi^+$ mesons directly and by a novel combination of fast electronic circuits reduces the accidental background at the counter to a few percent of the total count.

Considering now the illustrated embodiment of the invention and referring to the drawing, there is shown in Fig. 1 a photon beam 11 as from a high energy particle accelerator, such as a synchrotron. It has been determined that the incidence of a high energy beam of particles upon certain substances produces mesons and there is provided in the path of beam 11 a polyethylene cube 12 for this purpose. A beam of mesons 13 is emitted from cube 12 as a result of the incident photon beam 11 and these mesons are of the heavy type with a positive charge, and thus designated for convenience $\pi^+$ mesons.

It has been determined that the mesons produced in cube 12 are emitted directionally therefrom; the direction being dependent upon a variety of factors. In the illustrated embodiment a high concentration of mesons are emitted at right angles to the incident photon beam; however, when the so-called beam of mesons are emitted from the back of cube 12 and travel in the same direction as photon beam 11, it is desirable to direct the meson beam away from its original course as by a magnetic field in order to reduce the amount of extraneous charged particles present in the meson beam and to thereby reduce the background signal in the counter.

In the path of the highly concentrated meson radiation, or beam as it will hereafter be called, there is aligned a pair of scintillation crystals 14 and 16. It is desired that the $\pi^+$ mesons decay in the second crystal to $\mu^+$ mesons, as it is in conjunction with this phenomenon that the illustrated counting device operates. In order to stop mesons in crystal 16 it is necessary that crystal 16 be situated the proper distance from cube 12 so that the $\pi^+$ mesons will lose their kinetic energy at this point. Although mesons have a relatively short range even in vacuum, it is preferable to slow down the $\pi^+$ meson beam between cube 12 and the crystals in order that crystals 14 and 16 may be positioned quite close to cube 12. This may be accomplished by providing an absorber 17 in the path of $\pi^+$ meson beam 13 intermediate cube 12 and crystal 14; the purpose of absorber 17 being to slow down the $\pi^+$ mesons so that they will reach the end of their path in crystal 16. In this respect, it is noted that a variety of absorbing or retarding materials may be employed and further, that it is necessary to have a monoenergetic $\pi^+$ meson beam for substantially all of the $\pi^+$ mesons to stop in crystal 16.

Although it is not necessary, it is advantageous to combine crystals 14 and 16 and absorber 17 in a telescope arrangement 18 including a tube 19 surrounding and supporting same and providing not only a convenient support structure but also acting to shield crystals 14 and 16 from extraneous radiation. For this purpose, tube 19 may be formed of a good shielding material, such as lead or the like.

Attached to crystals 14 and 16 are photomultiplier tubes 21 and 22, respectively, and preferably there is formed a light-tight connection between crystals 14 and 16 and photomultiplier tubes 21 and 22, and in order to further intensify the light pulses to photomultiplier tubes 21 and 22, crystals 14 and 16 may be individually enclosed with a reflecting surface, such as aluminum foil. It is advantageous to directly attach crystals 14 and 16 to photomultiplier tubes 21 and 22, respectively, and to this end apertures may be formed in tube 19 and the crystals joined to the cathodes of the respective photomultiplier tubes at these apertures, as shown; light-tight connection being insured by wrapping the connection with black tape or the like.

There is provided a pair of amplifier circuits 23 and 24 connected to the outputs of photomultiplier tubes 21 and 22, respectively, and the output of amplifiers 23 and 24 are connected to a coincidence circuit 26. Amplifiers 23 and 24 and coincidence circuit 26 are preferably of the "distributed" type in order that rapidity of response will be maximized. Distributed amplifiers are known in the art and reference is made to U. S. Patent No. 2,593,948, issued April 22, 1952, to Wiegand et al. for a disclosure of distributed coincidence circuits. With these types of circuits, it is possible to obtain responses in $1 \times 10^{-8}$ seconds which will be seen to be a material advantage in the illustrated application of the invention.

Coincidence circuit 26 operates to pass a signal when the two incoming signals are in time-coincidence and this output signal is delayed a predetermined amount by a delay network which may constitute a delay cable or line 27 connected to coincidence circuit 26. The delayed signal may be further amplified by a distributed amplifier 28 connected to delay cable 27 and is then applied to a gate generator circuit 29; the operation of these circuit elements being considered in more detail below. Gate generator 29 produces square wave pulses of predetermined duration and of equal magnitude and these are applied to a second distributed coincidence circuit 31 and may be counted by a scaler circuit 32 connected intermediate gate generator 29 and coincidence circuit 31.

In addition to the above-noted elements and connections, there is provided a further connection from photomultiplier tube 22 of second crystal 16 to the second coincidence circuit 31, and a distributed amplifier 33 may be inserted in this connection. A second scaler circuit 34 is connected to the output of second coincidence circuit 31 to record the signals therefrom and an output terminal 36 may also be provided at this point for the connection thereto of various other measuring devices possibly advantageously associated with the above-described circuit.

Considering now the operation of the present invention and referring in part to Fig. 2, it is first noted that a telescope 18 is disposed to enclose a plurality of mesons moving longitudinally of the telescope 18 and designated as a beam 13. One method of obtaining a relatively strong meson beam 13 is to bombard a cube 12 of polyethylene with a beam of photons 11 which with certain geometry produces a beam of mesons 13 at right angles to the incident photon beam 11 as illustrated. Within telescope 18 there is situated a pair of scintillation crystals 14 and 16, formed of stilbene for example, and aligned with meson beam 13 so that beam 13 first passes crystal 14 and then into crystal 16. Also within telescope 18 there may be provided an absorber 17 which is preferably disposed adjacent cube 12 and which functions to reduce the energy of meson beam 13 and to therefore limit its range. The range of meson beam is reduced to the point where mesons of a predetermined energy come to rest in second crystal 16, and it is these mesons that are counted. If a substantially monoenergetic beam of mesons is to be counted, then an absorber 17 of proper material and thickness will stop practically all of the mesons in crystal 16; however, in the circumstance that mesons of various energies are present an absorber having a variable total thickness is best employed in order that mesons of different energies may be successively stopped in crystal 16 and counted.

Mesons passing through scintillation crystal 14 create individual light pulses which are transmitted to photomultiplier tube 21 and therein converted to corresponding electrical signals or pulses. Considering a single meson passing through crystal 14, there is shown at Fig. 2(a) a voltage pulse produced by photomultiplier tube 21 as a consequence thereof. This meson also produces a light pulse upon striking second crystal 16 which is in turn converted into an electrical signal by photomultiplier tube 22. Assuming that absorber 17 has removed from the sigle sample meson sufficient energy so that the meson comes to rest in second crystal 16, there is produced in second crystal 16 a second somewhat weaker light pulse by the decay of the incident $\pi^+$ meson to a $\mu^+$ meson. The light pulse produced by the $\mu^+$ meson is somewhat weaker than that from the incident $\pi^+$ meson, as may be seen at Fig. 2(b).

The two signals produced by $\pi^+$ meson, one in each crystal, are substantially coincident in time and thus they are passed by first coincidence circuit 26, and the resulting signal is shown at Fig. 2(c). It will be noted that the pulse produced by the $\mu^+$ meson in crystal 16 lags in time the $\pi^+$ meson signals and as there is no signal corresponding in time to the $\mu^+$ meson pulse, it does not pass the coincidence circuit. Inasmuch as the illustrated embodiment of the invention is designed to count $\pi^+$ mesons with maximum accuracy, it is necessary to minimize the possibility that other charged particles will be counted. To this end the present invention provides for a coincidence between the signal from the incident $\pi^+$ mesons and their $\mu^+$ meson decay products and accomplishes such by delaying the $\pi^+$ meson signal. The signal from first coincidence circuit 26 is fed through delay cable 27 which has a known impedance per unit length and a predetermined length to introduce a calculated delay in the arrival of the signal from first coincidence circuit 26 to gate generator 29. The length of the delay interval is made sufficiently long so that the resulting gate signal will coincide with the $\mu^+$ meson signal and the delay is preferably sufficiently long so that the resulting gate signal cannot coincide with the originating $\pi^+$ meson signal, as further explained below.

Gate generator 29 operates to produce a square wave pulse of known duration when triggered by an incoming signal, such as that from first coincidence circuit 26, and the square wave preferably has a very short rise time. Also gate generator 29 is preferably controllable to produce a square wave gate signal of any desired duration with a desired range. The gate signal shown at Fig. 2(e) is applied to one input terminal of second coincidence circuit 31 and there is applied to the other input circuit thereof the amplified signal from photomultiplier tube 22 connected to second crystal 16. This photomultiplier tube signal includes the $\mu^+$ meson signal as noted above and, inasmuch as the $\pi^+$ meson signal producing the gate signal has been delayed the proper amount, there is thus produced a coincidence at second coincidence circuit 31 and an output signal (Fig. 2(f)) is generated, which may be recorded on scaler circuit 34 and also applied to other measuring means, as desired, through terminal 36. Also the number of gate signals generated may be recorded by scaler circuit 32 connected between gate generator 29 and second coincidence circuit 31.

From the above it will be seen that the coincidences between gate signals and $\mu^+$ meson signals are recorded as a measure of the number of mesons traversing telescope 18 and coming to rest in second crystal 16. It will be appreciated that accurate counting with the illustrated embodiment of the invention requires a minimization of accidental coincidences in the circuit and maximization of $\mu^+$ and delayed $\pi^+$ coincidences. In order to fulfill these requirements, it is best that the gate signal be delayed a maximum amount and yet include the $\mu^+$ meson signal. This is accomplished by delaying the $\pi^+$ signal as much as possible, i. e., a time about equal to the mean life of $\pi^+$ mesons and by making the gate signal rise time very short. By this means broad pulses produced at the same time as the $\pi^+$ meson signals, by protons for example, will not extend past the beginning of the gate signal and cause undesirable coincidences. Also the gate signal is made to have an appreciable duration so that the probability of a coincidence with the $\mu^+$ meson signal is maximized.

As an example of preferred operating conditions the delay introduced may be about $2.5 \times 10^{-8}$ seconds and the gate signal may have a rise time of .005 microsecond and a duration of .08 microsecond. With these conditions the gate signal extends over about three $\pi^+$ meson half-lives and thus about 95% of the $\mu^+$ mesons are counted. It is necessary for gate circuit 29 to discriminate and to thereby reject signals of less than a predetermined minimum magnitude in order that the accidental background count will be minimized, and thus care must be taken with conventional gate circuits, in that operation thereof with less than a certain minimum gate signal duration commonly destroys the discriminatory properties thereof.

As will be apparent to those skilled in the art, the present invention exhibits advantages over prior known meson counting techniques. For example, the detection of $\pi^+$ meson decay has the advantage over conventional $\mu^+$ meson decay detection of reducing the accidental background; such reduction being essentially given by the ratio of $\pi^+$ meson mean life $\tau_{m\pi+}$ to the $\mu^+$ meson mean life $\tau_{m\mu+}$. This ratio $\tau_{m\pi+}/\tau_{m\mu+} \sim 0.01$ theoretically, and while this theoretical reduction is not quite obtainable because of electronic limitations, there is a material reduction of background signals. A further advantage lies in the fact that in counting $\pi^+$ mesons no corrections are necessary for $\mu$ mesons or $\mu^+$ meson pair production, which ordinarily present quite a problem.

It is possible to further decrease the background by using a triple delayed coincidence involving $\pi^+ \rightarrow \mu^+ \rightarrow \beta^+$ decay; however, the counting efficiency is quite low and thus the applicability thereof is somewhat limited. Also the above-described apparatus may be employed to determine the $\pi^+$ meson half-life and mean-life by employing a variable delay network or cable 27 and results are obtainable to within 0.002 microsecond.

While the present invention has been disclosed with respect to a single embodiment it will be apparent to those skilled in the art that various modifications may be made within the spirit and scope of the invention and thus it is not intended to limit the invention except by the terms of the following claims.

What is claimed is:

1. An improved electronic counter comprising a pair of scintillation crystals aligned in the path of a beam of particles to be counted, a pair of photomultiplier tubes connected one to each of said scintillation crystals to produce electric signals from light pulses in said crystals, a first coincidence circuit connected to the output of said photomultiplier tubes and passing a signal upon the coincidence of two input signals, a gate generator connected to said coincidence circuit and producing a square wave voltage pulse when triggered by the output of said first coincidence circuit, a second coincidence circuit connected to said gate generator, electrical connection from the photomultiplier connected to said scintallation crystal disposed in the direction of travel of said beam of particles from the other of said scintillation crystals to said second coincidence circuit, means recording the output of said second coincidence circuit, and electronic delay means delaying the signal from said first coincidence circuit an amount of time substantially equal to the decay time of the particles to be counted in said second crystal, whereby only signals from particles to be counted trigger said second coincidence circuit.

2. An improved electronic counter as claimed in claim 1 further defined by an absorber disposed in the path of said beam of particles to reduce the energy of the particles and cause particles of a particular energy to decay in said scintillation crystal and to thereby be counted by said scaler circuit.

3. An improved meson counter comprising a first scintillation crystal disposed in a meson beam, a photomultiplier tube connected to said first scintillation crystal, a second scintillation crystal disposed in said meson beam in the direction of travel thereof from said first crystal, a photomultiplier tube connected to said second scintillation crystal, a first coincidence circuit having an input connected to said photomultiplier tubes, a delay line connected to the output of said first coincidence circuit and delaying the pulses therefrom approximately .025 microsecond, a gate generator circuit having an input connected to said delay line, a second coincidence circuit having an input connected to said gate generator circuit, connection between the photomultiplier tube of said second scintillation crystal to the input of said second coincidence circuit, and recording means connected to the output of said second coincidence circuit and recording the number of mesons decaying in said second scintillation crystal and producing signals coincident with delayed signals from said first coincidence circuit.

4. An improved meson counter as claimed in claim 3 further defined by said gate generator circuit producing a square wave voltage pulse having a duration of approximately the three times the meson half-life.

5. An improved meson counter as claimed in claim 3 further defined by an absorber disposed in the path of said meson beam in front of said scintillation crystals relative to said meson beam and reducing the energy of mesons passing therethrough to cause mesons of a particular energy to come to rest in said second scintillation crystal and decay therein to be counted.

6. An improved meson counter for counting $\pi^+$ mesons and comprising a telescope aligned with and surrounding a meson beam to be counted, first and second scintillation crystals disposed in said telescope with said second crystal being displaced from said first crystal in the direction of travel of said beam, an absorber disposed in said telescope on the opposite side of said first crystal from said second crystal and reducing the energy of mesons passing therethrough a predetermined amount to cause mesons of a particular energy to come to rest in said second crystal, first and second photomultiplier tubes connected to said first and second scintillation crystals respectively, a first distributed coincidence circuit having an input connected to said first and second photomultiplier tubes and producing an output pulse for each coincidence of input signals, a delay cable connected to said first coincidence circuit and delaying the signal therefrom an amount substantially equal to the half-life of $\pi^+$ mesons, a gate generator connected to said delay line and triggered by the signal therefrom to produce a square wave voltage pulse having a fast rise time and a duration of substantially three $\pi^+$ meson half-lives, a second distributed coincidence circuit having an input connected to said gate generator, connections from said photomultiplier tube to said second coincidence circuit to transmit thereto voltage pulses resulting from $\mu^+$ meson decay products of $\pi^+$ mesons coming to rest in said second scintillation crystal, and recording means associated with said second coincidence circuit counting coincidences between $\mu^+$ meson signals and said delayed gate signal as a measure of $\pi^+$ mesons coming to rest in said second scintillation crystal.

MARK J. JAKOBSON.

References Cited in the file of this patent

UNITED STATES PATENTS

| Number | Name | Date |
|---|---|---|
| 2,517,404 | Morton | Aug. 1, 1950 |
| 2,554,933 | Wouters | May 29, 1951 |
| 2,593,948 | Wiegand et al. | Apr. 22, 1952 |
| 2,595,552 | Thomas | May 6, 1952 |

OTHER REFERENCES

"Introduction to Modern Physics," Richtmyer et al., 1947, pub. by McGraw-Hill Book Co., New York, N. Y.

"A Fast Coincidence Circuit, etc.," Bell et al., MDDC-799, April 27, 1947, pp. 1-4.